US012506268B2

(12) United States Patent
Chi et al.

(10) Patent No.: US 12,506,268 B2
(45) Date of Patent: Dec. 23, 2025

(54) ANTENNA STRUCTURE, ANTENNA ARRAY AND FREQUENCY CORRECTION METHOD OF ANTENNA STRUCTURE

(71) Applicant: Universal Scientific Industrial (Shanghai) Co., Ltd., Shanghai (CN)

(72) Inventors: Kuang-Ting Chi, Shanghai (CN); Shih-Chi Tseng, Shanghai (CN); Yu-Cheng Liu, Shanghai (CN)

(73) Assignee: Universal Scientific Industrial (Shanghai) Co., Ltd., Shanghai (CN)

( * ) Notice: Subject to any disclaimer, the term of this patent is extended or adjusted under 35 U.S.C. 154(b) by 614 days.

(21) Appl. No.: 18/046,942

(22) Filed: Oct. 17, 2022

(65) Prior Publication Data

US 2024/0047885 A1 Feb. 8, 2024

(30) Foreign Application Priority Data

Aug. 3, 2022 (CN) ........................ 202210926305.X

(51) Int. Cl.
*H01Q 9/04* (2006.01)
*H01Q 21/08* (2006.01)

(52) U.S. Cl.
CPC ........... *H01Q 9/0442* (2013.01); *H01Q 9/045* (2013.01); *H01Q 21/08* (2013.01)

(58) Field of Classification Search
CPC ...... H01Q 9/0442; H01Q 9/045; H01Q 21/08; H01Q 21/24; H01Q 9/0457; H01Q 1/36; H01Q 1/12; H01Q 1/50; H01Q 3/00; H01Q 5/10; H01Q 5/20; H01Q 5/30; H01Q 5/50; H01Q 21/06
See application file for complete search history.

(56) References Cited

U.S. PATENT DOCUMENTS

| | | | | |
|---|---|---|---|---|
| 9,806,431 B1* | 10/2017 | Izadian | H01Q 21/005 | |
| 10,186,492 B1* | 1/2019 | Wan | H01L 21/568 | |
| 2003/0020655 A1* | 1/2003 | McKinzie, III | H01Q 1/38 | 343/909 |
| 2009/0073075 A1* | 3/2009 | Irion, II | H01Q 9/16 | 343/859 |
| 2013/0313328 A1* | 11/2013 | Mohajer-Iravani | H01Q 13/18 | 235/492 |
| 2015/0097737 A1* | 4/2015 | Vemagiri | H01Q 1/50 | 343/702 |

(Continued)

FOREIGN PATENT DOCUMENTS

| | | |
|---|---|---|
| CN | 207690994 U | 8/2018 |
| CN | 110518340 A | 11/2019 |

(Continued)

*Primary Examiner* — Dameon E Levi
*Assistant Examiner* — Jordan E. DeWitt
(74) *Attorney, Agent, or Firm* — CKC & Partners Co., LLC

(57) ABSTRACT

An antenna structure is configured to receive a set of feeding signals via a set of signal feeding nodes to resonate. The antenna structure includes a frame assembly and a radiation assembly. The frame assembly has four side walls. The four side walls form a resonance cavity. Two of the four side walls include two vias, and the two vias are electrically connected to the set of signal feeding nodes, and is configured to receive the set of feeding signals. The radiation assembly is correspondingly connected to the frame assembly. The two of the four side walls are adjacent to each other.

10 Claims, 7 Drawing Sheets

(56) References Cited

U.S. PATENT DOCUMENTS

2015/0311594 A1* 10/2015 Zhu ........................ H01Q 21/28
343/702
2016/0006118 A1* 1/2016 Maruyama ......... H01Q 21/0081
343/702
2018/0159203 A1* 6/2018 Baks ...................... H01Q 9/045
2019/0020114 A1* 1/2019 Paulotto ................... H01Q 9/40
2020/0287266 A1* 9/2020 Deleniv .................... H01P 7/06
2020/0287287 A1* 9/2020 Ying .................... H01Q 9/0407
2020/0287298 A1* 9/2020 Ueda .................... H01Q 9/0407
2021/0044018 A1* 2/2021 Takaki ................... H01Q 5/307
2021/0050651 A1* 2/2021 Jung ...................... H01Q 25/00
2022/0059917 A1* 2/2022 Rospsha ............... H01P 11/002
2022/0085506 A1* 3/2022 Lim ....................... H01Q 1/243
2022/0158327 A1* 5/2022 An ......................... H01Q 23/00
2022/0166149 A1* 5/2022 So .......................... H01Q 5/307
2022/0278456 A1* 9/2022 Wang ................... H01Q 9/0457
2022/0311125 A1* 9/2022 Asrani ................... H01Q 1/243
2022/0320743 A1* 10/2022 Igarashi ................... H01Q 5/35
2022/0359989 A1* 11/2022 Wang ..................... H01Q 21/08
2023/0076937 A1* 3/2023 Le Gall ................ H01Q 15/242
2023/0114757 A1* 4/2023 Fabrega Sanchez ........................
H01Q 21/062
343/772
2023/0121641 A1* 4/2023 Lee ........................ H01Q 19/09
343/700 MS
2023/0155284 A1* 5/2023 Makurin ................ H01Q 9/045
342/372
2023/0231295 A1* 7/2023 Yoon ...................... H01Q 1/526
343/700 R
2023/0352840 A1* 11/2023 Tian ..................... H01Q 21/065
2024/0047885 A1* 2/2024 Chi ........................ H01Q 9/045
2024/0195085 A1* 6/2024 Vilenskiy ............. H01Q 25/001
2024/0283154 A1* 8/2024 Johnson ................. H01Q 21/26
2024/0283168 A1* 8/2024 Tamasy ................ H01Q 21/062
2024/0429611 A1* 12/2024 Aviv ...................... H01Q 5/364

FOREIGN PATENT DOCUMENTS

EP 3624263 A1 * 3/2020 ............... H01Q 5/10
TW I411158 B 10/2013

* cited by examiner

ANTENNA STRUCTURE, ANTENNA ARRAY AND FREQUENCY CORRECTION METHOD OF ANTENNA STRUCTURE

RELATED APPLICATIONS

This application claims priority to China Application Serial Number 202210926305.X, filed Aug. 3, 2022, which is herein incorporated by reference.

BACKGROUND

Technical Field

The present disclosure relates to an antenna structure, an antenna array and a frequency correction method of an antenna structure. More particularly, the present disclosure relates to an antenna structure, an antenna array and a frequency correction method of an antenna structure for 5G millimeter-wave (mmWave).

Description of Related Art

The conventional three-dimensional mmWave antenna structure is hard to be implemented because the structure of the resonance cavity of the conventional three-dimensional mmWave antenna structure is complicated. Therefore, most of the mmWave antennas are planar patch antennas, and the planar patch antennas can only be applied to single frequency band.

Moreover, although a frequency of an antenna has been tested during the manufacturing stage to make sure the frequency is in a predetermined frequency range, when the antenna is arranged on an electronic device, the frequency of the antenna may be interfered and shifted by a housing of the electronic device.

Thus, an antenna structure, which has a simple structure and the frequency of the antenna structure can be adjusted, is commercially desirable.

SUMMARY

According to one aspect of the present disclosure, an antenna structure is configured to receive a set of feeding signals via a set of signal feeding nodes to resonate. The antenna structure includes a frame assembly and a radiation assembly. The frame assembly has four side walls. The four side walls form a resonance cavity. Two of the four side walls include two vias, the two vias are electrically connected to the set of signal feeding nodes, and are configured to receive the set of feeding signals. The radiation assembly is correspondingly connected to the frame assembly. The two of the four side walls are adjacent to each other.

According to another aspect of the present disclosure, an antenna array is configured to receive a plurality set of feeding signals via a plurality set of signal feeding nodes to resonate, respectively. The antenna array includes a plurality of antenna structures. Each of the antenna structures includes a frame assembly and a radiation assembly. The frame assembly has four side walls. The four side walls form a resonance cavity. Two of the four side walls include two vias, the two vias are electrically connected to one set of the signal feeding nodes, and are configured to receive one set of the feeding signals. The radiation assembly is correspondingly connected to the frame assembly. The two of the four side walls are adjacent to each other.

According to further another aspect of the present disclosure, a frequency correction method of an antenna structure is configured to correct a radiation resonance frequency of the antenna structure to obtain a radiation correction resonance frequency. The antenna structure includes a frame assembly and a radiation assembly. The radiation assembly corresponds to the radiation resonance frequency. The frequency correction method of the antenna structure includes performing an antenna disposing step, a frequency measuring step and a radiation assembly changing step. The antenna disposing step is performed to dispose the antenna structure on a housing. The frequency measuring step is performed to measure the radiation resonance frequency of the antenna structure. The radiation assembly changing step is performed to remove the radiation assembly from the antenna structure, and correspondingly connect another radiation assembly to the frame assembly to adjust the radiation resonance frequency of the antenna structure to the radiation correction resonance frequency. The another radiation assembly corresponds to the radiation correction resonance frequency. The frame assembly has four side walls. The four side walls form a resonance cavity. Two of the four side walls include two vias. The two vias are electrically connected to a set of signal feeding nodes and are configured to receive a set of feeding signals. The two of the four side walls are adjacent to each other.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
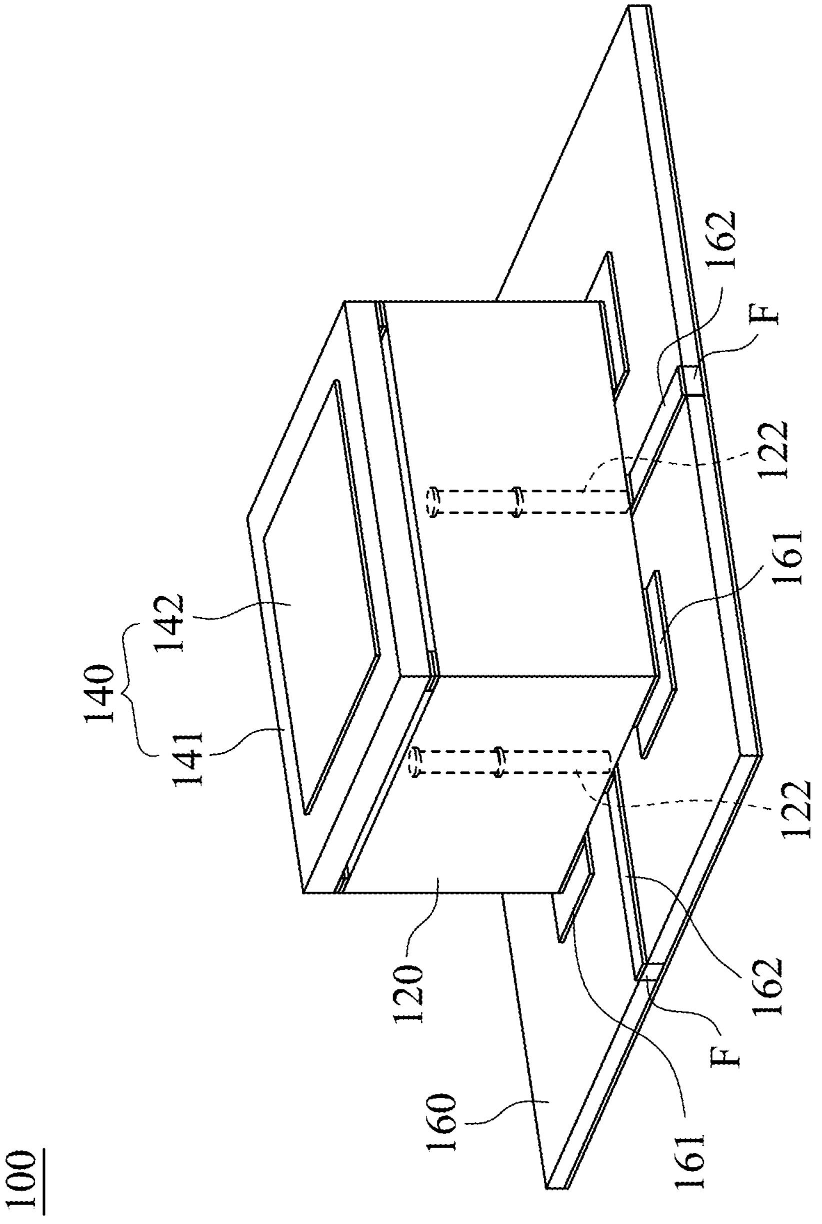
FIG. 1 shows a three-dimensional schematic view of an antenna structure according to a first embodiment of the present disclosure.
Figure 2:
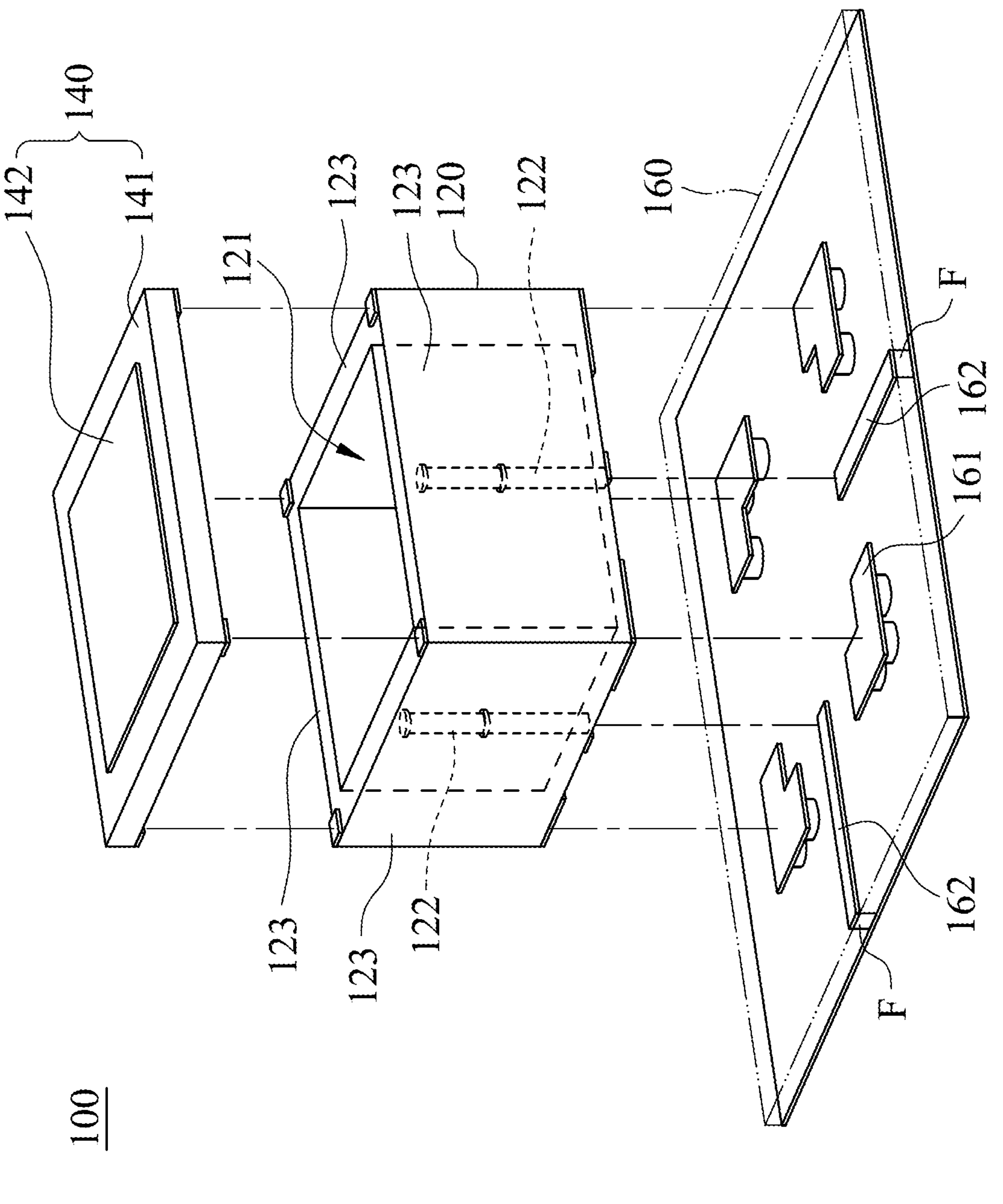
FIG. 2 shows an exploded view of the antenna structure of FIG. 1.

Please refer to FIG. 1 and FIG. 2. FIG. 1 shows a three-dimensional schematic view of an antenna structure 100 according to a first embodiment of the present disclosure. FIG. 2 shows an exploded view of the antenna structure 100 of FIG. 1. The antenna structure 100 is configured to receive a set of feeding signals (not shown) via a set of signal feeding nodes F to resonate. The antenna structure 100 includes a frame assembly 120 and a radiation assembly 140. The frame assembly 120 has four side walls 123. The four side walls 123 form a resonance cavity 121. Two of the four side walls 123 include two vias 122, and the two vias

122 are electrically connected to the set of signal feeding nodes F (i.e., two signal feeding nodes F), and are configured to receive the set of feeding signals (i.e., two feeding signals). The radiation assembly 140 is correspondingly connected to the frame assembly 120. The two of the four side walls 123 are adjacent to each other. Thus, the antenna structure 100 of the present disclosure can be applied to a dual frequency band via the stereoscopic frame assembly 120 and the planar radiation assembly 140, and achieves dual polarization to receive and transmit signals in a vertically polarized direction and a horizontally polarized direction by dual feeding.

In the first embodiment, the frame assembly 120 can be a FR4 substrate, or a printed circuit board (PCB) without the middle portion and with the frame thereof. The hollow middle portion of the frame assembly 120 forms the resonance cavity 121. The frame assembly 120 is square-shaped, and has four side walls 123, but the present disclosure is not limited thereto. The two vias 122 (which can be two blind buried holes) of the two of the four side walls 123 of the frame assembly 120 correspond to the signal feeding nodes F, and the two vias 122 are for the feeding signals to feed in.

The radiation assembly 140 can include a radiation substrate 141 and a patch structure 142. A side of the radiation substrate 141 faces towards to the resonance cavity 121. The patch structure 142 is disposed on another side of the radiation substrate 141. In the first embodiment, the radiation substrate 141 can be a ceramic substrate, and the frame assembly 120 and the radiation assembly 140 are connected by soldering, but the present disclosure is not limited thereto.

Figure 3:
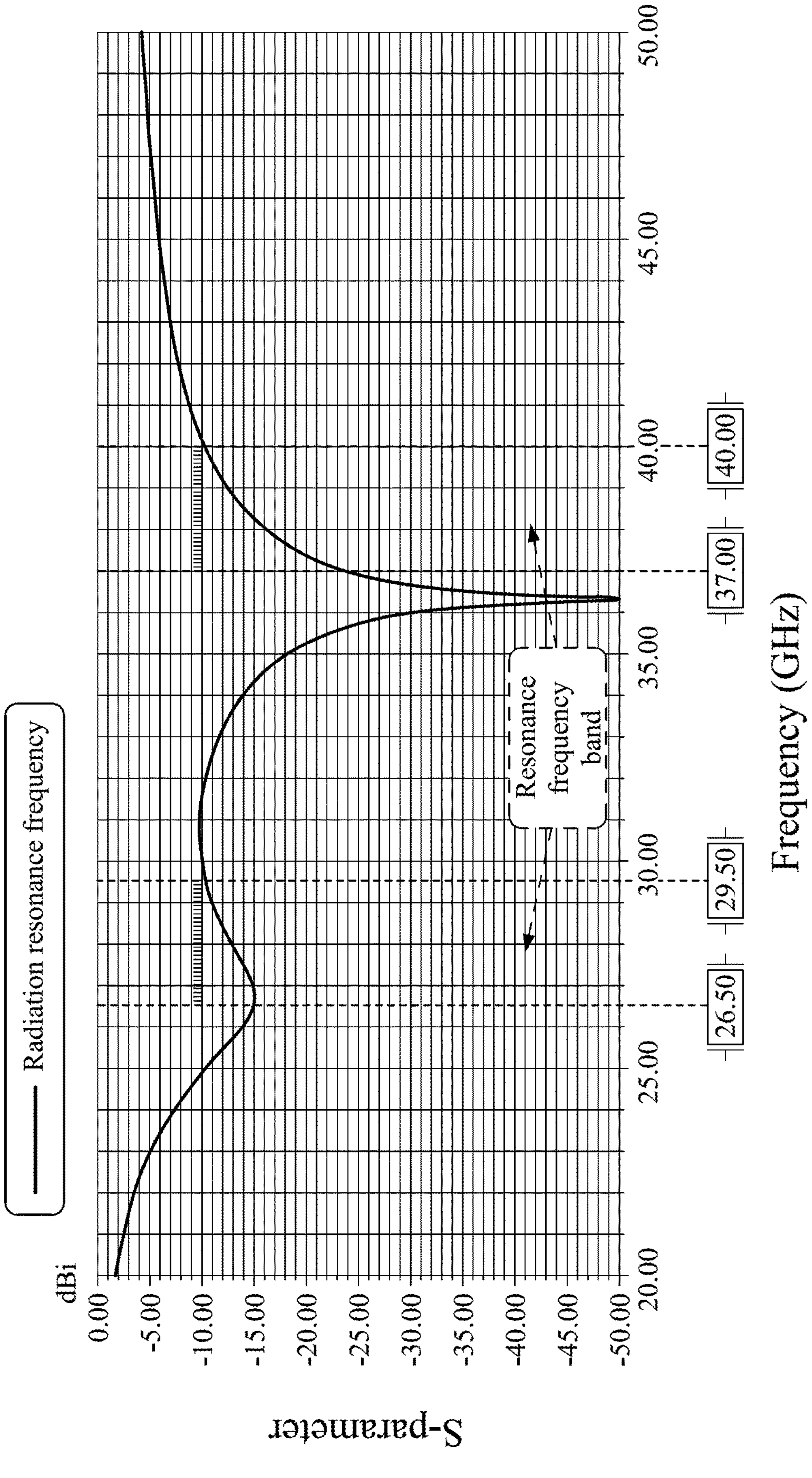
FIG. 3 shows a schematic view of a radiation resonance frequency and S-parameter of the antenna structure of FIG. 1.

Please refer to FIG. 1 to FIG. 3. FIG. 3 shows a schematic view of a radiation resonance frequency and S-parameter of the antenna structure 100 of FIG. 1. Due to the antenna structure 100 in the first embodiment includes the frame assembly 120 and the radiation assembly 140, a resonance frequency band of the antenna structure 100 can include a cavity resonance frequency and a radiation resonance frequency. The cavity resonance frequency corresponds to the resonance cavity 121. The radiation resonance frequency corresponds to the radiation assembly 140. The cavity resonance frequency is greater than the radiation resonance frequency. In other words, when the set of feeding signals are fed in the antenna structure 100 from the signal feeding nodes F, the resonance cavity 121 of the frame assembly 120 resonates at the cavity resonance frequency, and the patch structure 142 of the radiation assembly 140 resonates at the radiation resonance frequency, which is smaller than the cavity resonance frequency. According to the first embodiment, the cavity resonance frequency can be greater than or equal to 37 GHz and smaller than or equal to 40 GHz, and the radiation correction resonance frequency can be greater than or equal to 26.5 GHz and smaller than or equal to 29.5 GHz, that is, the resonance frequency band of the first embodiment is between 26.5 GHz to 29.5 GHz and 37 GHz to 40 GHz, but the present disclosure is not limited thereto. Thus, the antenna structure 100 of the present disclosure can cover the frequency bands n257, n260 and n261 of the 5G Frequency Range 2 (FR2) by combining the resonance cavity 121, which is made of a common circuit board material, with a simple structure and the radiation assembly 140 with high permittivity.

Please refer to FIG. 1 and FIG. 2. The antenna structure 100 can further include a carrier 160. The frame assembly 120 is disposed on the carrier 160. The carrier 160 includes a plurality of soldering pads 161 and two micro-strip lines 162. The two micro-strip lines 162 are electrically connected to the two vias 122, respectively. The set of the feeding signals are transmitted to the two vias 122 via the two micro-strip lines 162. The frame assembly 120 is soldered on the soldering pads 161 of the carrier 160 by a Surface Mount Technology (SMT).

In detail, the carrier 160 is disposed at the bottom of the frame assembly 120, and the frame assembly 120 is fixed on the soldering pads 161 by soldering. The two micro-strip lines 162 are electrically connected to the two vias 122, respectively. Therefore, the set of feeding signals (i.e., two feeding signals) can be fed in the micro-strip lines 162 from the signal feeding nodes F, and transmitted to the two vias 122.

Figure 6:
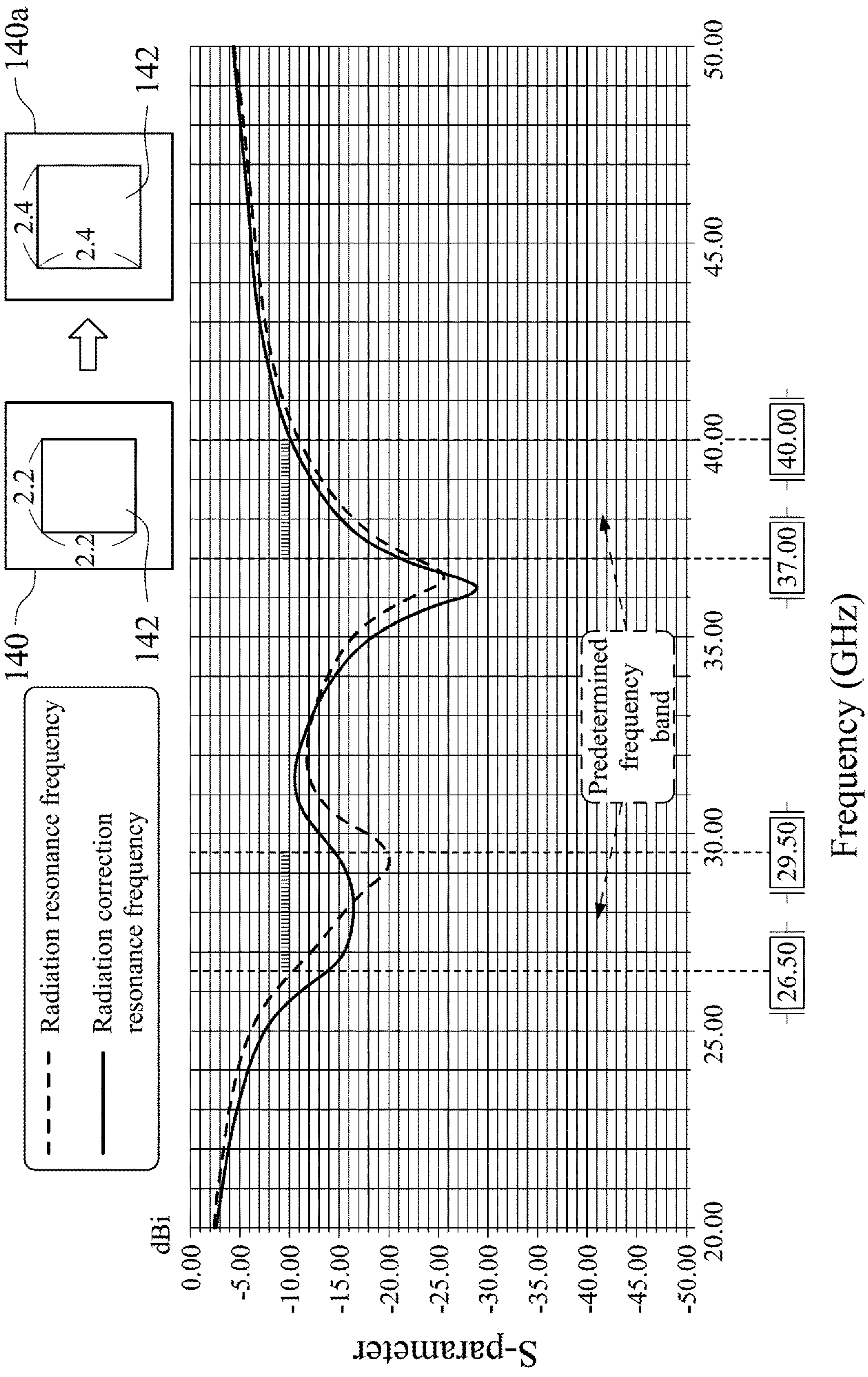
FIG. 6 shows a schematic view of S-parameter and a frequency decreasing correction step of the frequency correction method of the antenna structure of FIG. 5.
Figure 7:
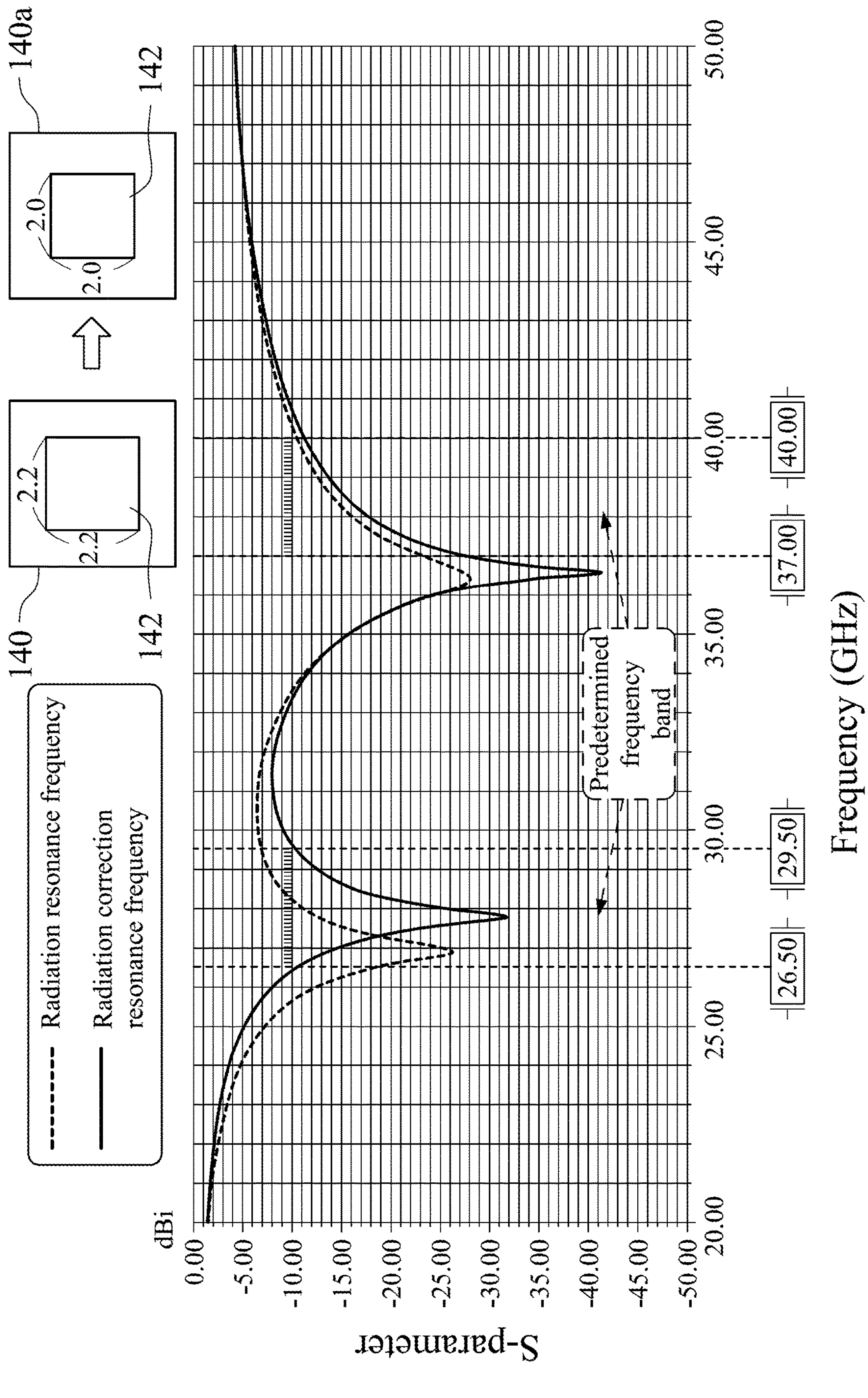
FIG. 7 shows a schematic view of S-parameter and a frequency increasing correction step of the frequency correction method of the antenna structure of FIG. 5.

Moreover, the antenna structure 100 can further include another radiation assembly 140*a* (as shown in FIG. 6 and FIG. 7). The radiation assembly 140 and the another radiation assembly 140*a* can be alternately changed with each other, and detachably and correspondingly connected to the frame assembly 120. In other words, under the configuration that both of the radiation assemblies 140, 140*a* are detachably connected to the frame assembly 120, the radiation assembly 140 can be replaced by the radiation assembly 140*a*, which has a patch structure 142 with different size. In detail, the patch structure 142 of the radiation assembly 140 corresponds to the radiation resonance frequency, and the patch structure 142 of the radiation assembly 140 has a first area. The patch structure 142 of the radiation assembly 140*a* corresponds to the radiation correction resonance frequency, and the patch structure 142 of the radiation assembly 140*a* has a second area. Thus, the resonance frequency band of the antenna structure 100 can be adjusted by alternating the radiation assemblies 140, 140*a* with the patch structures 142, which have different areas or different patterns.

Figure 4:
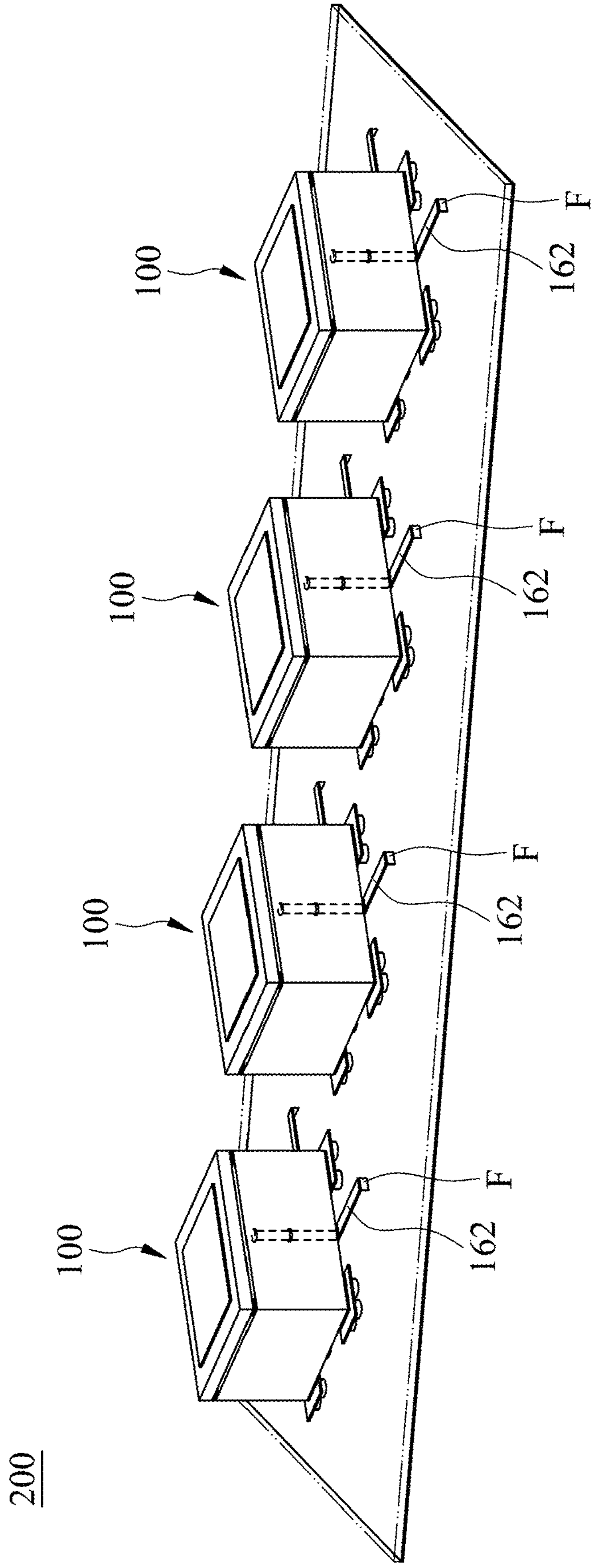
FIG. 4 shows a three-dimensional schematic view of an antenna array according to a second embodiment of the present disclosure.

Please refer to FIG. 1 and FIG. 4. FIG. 4 shows a three-dimensional schematic view of an antenna array 200 according to a second embodiment of the present disclosure. The antenna array 200 is configured to receive a plurality set of feeding signals via a plurality set of signal feeding nodes F to resonate, respectively. The antenna array 200 includes a plurality of antenna structures 100. In the second embodiment, each of the antenna structures 100 of the antenna array 200 is the same as the antenna structure 100 in the first embodiment, and will not be described again herein. In the second embodiment, a number of the antenna structures 100 is four, the signal feeding nodes F of the four antenna structures 100 are disposed in the same position, but the present disclosure is not limited thereto. A gain of a low-frequency band of the antenna array 200 is at least greater than 12.2 dBi, and a gain of a high-frequency band of the antenna array 200 is at least greater than 13.3 dBi. Therefore, the antenna array 200 of the present disclosure can satisfy a high gain requirement of 5G.

Figure 5:
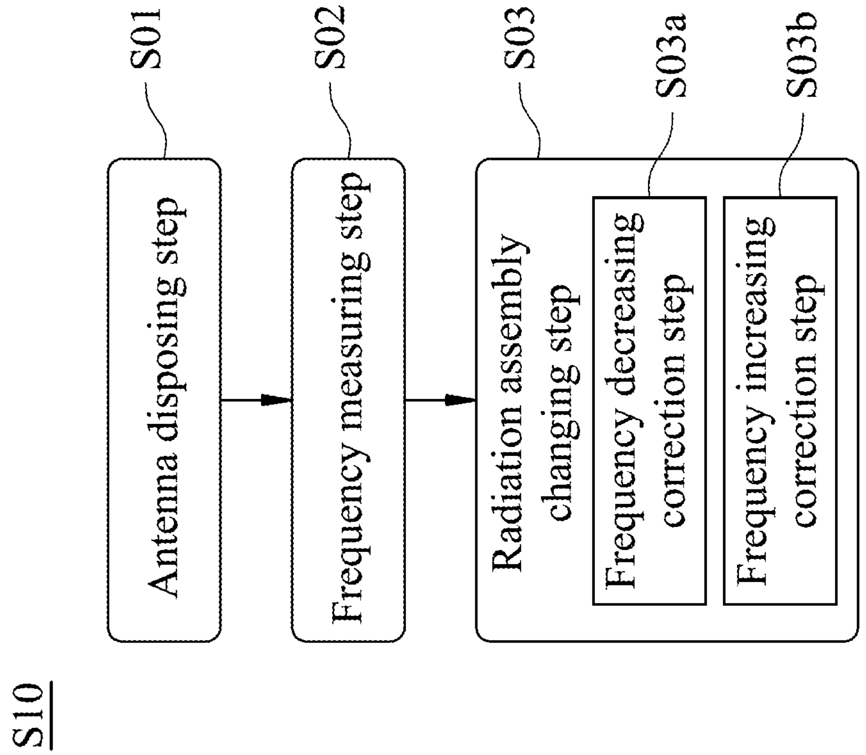
FIG. 5 shows a flow chart of a frequency correction method of an antenna structure according to a third embodiment of the present disclosure.

Please refer to FIG. 1, FIG. 3 and FIG. 5. FIG. 5 shows a flow chart of a frequency correction method S10 of an antenna structure 100 according to a third embodiment of the present disclosure. The frequency correction method S10 of the antenna structure 100 is configured to correct a radiation resonance frequency of the antenna structure 100 to obtain a radiation correction resonance frequency. The frequency correction method S10 of the antenna structure 100 includes performing an antenna disposing step S01, a frequency measuring step S02 and a radiation assembly changing step S03. The antenna disposing step S01 is performed to dispose the antenna structure 100 on a housing (not shown). The frequency measuring step S02 is performed to measure the radiation resonance frequency of the antenna structure 100. The radiation assembly changing step S03 is performed to remove the radiation assembly 140 from the antenna structure 100, and correspondingly connect another radiation assembly 140*a* to the frame assembly 120 to adjust the radiation resonance frequency of the antenna structure 100 to the radiation correction resonance frequency. The radiation assembly 140 corresponds to the radiation resonance frequency. The radiation assembly 140*a* corresponds to the radiation correction resonance frequency.

In the third embodiment, the antenna structure 100 is the same as the antenna structure 100 in the first embodiment, and will not be described again herein. In detail, the resonance frequency band of the antenna structure 100 is shown in FIG. 3 (i.e., the resonance frequency band is between 26.5 GHz to 29.5 GHz and 37 GHz to 40 GHz), when the manufacturing process of the antenna structure 100 is completed. However, when the antenna structure 100 is arranged on a housing of an electronic device (such as a cell phone) by the antenna disposing step S01, the resonance frequency band of the antenna structure 100 may be interfered and shifted by the housing.

In the radiation assembly changing step S03, the radiation assembly 140 is replaced with the radiation assembly 140*a* to adjust the radiation resonance frequency. In detail, in the radiation assembly changing step S03, the frame assembly 120 and the radiation assembly 140, which are connected by soldering, are desoldered via a heat gun, and the radiation assembly 140 fixed on the frame assembly 120 is removed. Adjusting the pattern or the size of the patch structure 142 of the radiation assembly 140 can generate different radiation resonance frequency. The pattern or the size of the patch structure 142 of radiation assembly 140*a* is different from the pattern or the size of the patch structure 142 of the radiation assembly 140. When the resonance frequency band is shifted because of the disposing environment of the antenna structure 100, the frequency correction method S10 of the antenna structure 100 of the present disclosure can correct the radiation resonance frequency by changing the radiation assembly 140 to avoid the situation of reprinting the antenna pattern due to the shifted resonance frequency band, thereby, reducing the verification time.

Please refer to FIG. 5 and FIG. 6. FIG. 6 shows a schematic view of S-parameter and a frequency decreasing correction step S03*a* of the frequency correction method S10 of the antenna structure 100 of FIG. 5. The radiation assembly changing step S03 can include a frequency decreasing correction step S03*a* and a frequency increasing correction step S03*b*. The frequency decreasing correction step S03*a* is performed to correct the radiation resonance frequency, which is greater than a predetermined frequency band, to the radiation correction resonance frequency in the predetermined frequency band. When the radiation resonance frequency is greater than the radiation correction resonance frequency, a second area of the patch structure 142 of the radiation assembly 140*a* is greater than a first area of the patch structure 142 of the radiation assembly 140. In response to determining that the radiation resonance frequency is greater than the predetermined frequency band, the frequency decreasing correction step S03*a* is performed; in response to determining that the radiation resonance frequency is smaller than the predetermined frequency band, the frequency increasing correction step S03*b* is performed. Moreover, when the radiation resonance frequency measured by the frequency measuring step S02 exceeds the predetermined frequency band, and is greater than the predetermined frequency band, the frequency decreasing correction step S03*a* is performed to remove the radiation assembly 140, and alternate the radiation assembly 140 by the radiation assembly 140*a* with the patch structure 142, which has a bigger area (the second area), to let the radiation correction resonance frequency meet the predetermined frequency band. According to the third embodiment, the predetermined frequency band is a frequency band measured when the antenna structure is not disposed in the housing, that is, the predetermined frequency band is the resonance frequency band of the antenna structure 100 in the first embodiment. In FIG. 6, the first area of the patch structure 142 of the radiation assembly 140 is 2.2×2.2 $mm^2$, the second area of the patch structure 142 of the radiation assembly 140*a* is 2.4×2.4 $mm^2$, but the present disclosure is not limited thereto.

Please refer to FIG. 5 and FIG. 7. FIG. 7 shows a schematic view of S-parameter and the frequency increasing correction step S03*b* of the frequency correction method S10 of the antenna structure 100 of FIG. 5. The frequency increasing correction step S03*b* is performed to correct the radiation resonance frequency, which is smaller than a predetermined frequency band, to the radiation correction resonance frequency in the predetermined frequency band. When the radiation resonance frequency is smaller than the radiation correction resonance frequency, the second area of the patch structure 142 of the radiation assembly 140*a* is less than the first area of the patch structure 142 of the radiation assembly 140. Moreover, when the radiation resonance frequency measured by the frequency measuring step S02 exceeds the predetermined frequency band, and is smaller than the predetermined frequency band, the frequency increasing correction step S03*b* is performed to remove the radiation assembly 140, and alternate the radiation assembly 140 by the radiation assembly 140*a* with the patch structure 142, which has a smaller area (the second area), to let the radiation correction resonance frequency meet the predetermined frequency band. In FIG. 7, the first area of the patch structure 142 of the radiation assembly 140 is 2.2×2.2 $mm^2$, the second area of the patch structure 142 of the radiation assembly 140*a* is 2.0×2.0 $mm^2$, but the present disclosure is not limited thereto.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An antenna structure comprising:

a set of signal feeding nodes configured to receive a set of feeding signals;

a frame assembly having four side walls, the four side walls forming a resonance cavity, wherein two of the four side walls comprise two vias, the two vias are electrically connected to the set of signal feeding nodes, and are configured to receive the set of feeding signals; and a radiation assembly correspondingly connected to the frame assembly;

wherein the two of the four side walls are adjacent to each other;

wherein the antenna structure further comprising:
another radiation assembly, wherein the another radiation assembly and the radiation assembly are alternately changed with each other, and detachably and correspondingly connected to the frame assembly:
wherein a patch structure of the radiation assembly corresponds to a radiation resonance frequency, and the patch structure of the radiation assembly has a first area;
a patch structure of the another radiation assembly corresponds to a radiation correction resonance frequency, and the patch structure of the another radiation assembly has a second area;
when the radiation resonance frequency is greater than the radiation correction resonance frequency, the second area is greater than the first area;
when the radiation resonance frequency is smaller than the radiation correction resonance frequency, the second area is less than the first area.

2. The antenna structure of claim 1, wherein a resonance frequency band of the antenna structure comprises:
a cavity resonance frequency corresponding to the resonance cavity; and
a radiation resonance frequency corresponding to the radiation assembly;
wherein the cavity resonance frequency is greater than the radiation resonance frequency.

3. The antenna structure of claim 2, wherein the radiation assembly comprises:
a radiation substrate, a side of the radiation substrate faces towards the resonance cavity; and
the patch structure disposed on another side of the radiation substrate;
wherein the patch structure corresponds to one of the radiation resonance frequency and the radiation correction resonance frequency.

4. The antenna structure of claim 2, wherein the cavity resonance frequency is greater than or equal to 37 GHz and smaller than or equal to 40 GHz, and the radiation correction resonance frequency is greater than or equal to 26.5 GHZ and smaller than or equal to 29.5 GHZ.

5. The antenna structure of claim 3, wherein the frame assembly is a FR4 substrate, and the radiation substrate is a ceramic substrate.

6. The antenna structure of claim 1, wherein the frame assembly and the radiation assembly are connected by soldering.

7. The antenna structure of claim 1, further comprising:
a carrier, wherein the frame assembly is disposed on the carrier, and the carrier comprises:
a plurality of soldering pads; and
two micro-strip lines electrically connected to the two vias, respectively, wherein the set of the feeding signals are transmitted to the two vias via the two micro-strip lines;
wherein the frame assembly is fixed on the carrier via the soldering pads.

8. An antenna array comprising:
a plurality of antenna structures, each of the antenna structures comprising:
a set of signal feeding nodes configured to receive a set of feeding signals;
a frame assembly having four side walls, the four side walls forming a resonance cavity, wherein two of the four side walls comprise two vias, the two vias are electrically connected to one set of the signal feeding nodes, and are configured to receive one set of the feeding signals; and
a radiation assembly correspondingly connected to the frame assembly;
wherein the two of the four side walls are adjacent to each other;
wherein each of the antenna structures further comprising:
another radiation assembly, wherein the another radiation assembly and the radiation assembly are alternately changed with each other, and detachably and correspondingly connected to the frame assembly;
wherein a patch structure of the radiation assembly corresponds to a radiation resonance frequency, and the patch structure of the radiation assembly has a first area;
a patch structure of the another radiation assembly corresponds to a radiation correction resonance frequency, and the patch structure of the another radiation assembly has a second area;
when the radiation resonance frequency is greater than the radiation correction resonance frequency, the second area is greater than the first area;
when the radiation resonance frequency is smaller than the radiation correction resonance frequency, the second area is less than the first area.

9. A frequency correction method of an antenna structure, which is configured to correct a radiation resonance frequency of the antenna structure to obtain a radiation correction resonance frequency, the antenna structure comprising a frame assembly and a radiation assembly, and the frequency correction method of the antenna structure comprising:
performing an antenna disposing step, wherein the antenna structure is disposed on a housing;
performing a frequency measuring step, wherein the radiation resonance frequency of the antenna structure is measured; and
performing a radiation assembly changing step, wherein the radiation assembly is removed from the antenna structure, and another radiation assembly is correspondingly connected to the frame assembly to adjust the radiation resonance frequency of the antenna structure to the radiation correction resonance frequency, wherein the radiation assembly corresponding to the radiation resonance frequency, and the another radiation assembly corresponds to the radiation correction resonance frequency;
wherein the frame assembly has four side walls, the four side walls form a resonance cavity, two of the four side walls comprise two vias, the two vias are electrically connected to a set of signal feeding nodes and are configured to receive a set of feeding signals, and the two of the four side walls are adjacent to each other;
wherein the radiation assembly changing step comprises:
performing a frequency decreasing correction step, wherein the radiation resonance frequency, which is greater than a predetermined frequency band, is corrected to the radiation correction resonance frequency in the predetermined frequency band by changing the radiation assembly to the another radiation assembly, wherein the radiation resonance frequency is greater than the radiation correction resonance frequency, wherein a second area of a patch structure of the another radiation assembly is greater than a first area of a patch structure of the radiation assembly; and performing a frequency increasing correction step, wherein the radiation resonance frequency, which is smaller than the predetermined frequency band, is corrected to the radiation correction resonance frequency in the predetermined frequency band by changing the radiation assembly to the another radiation assembly, wherein the radiation resonance frequency is smaller than the radiation correction resonance frequency, wherein the second area of the patch structure of the another radiation assembly is less than the first area of the patch structure of the radiation assembly:

wherein in response to determining that the radiation resonance frequency is greater than the predetermined frequency band, the frequency decreasing correction step is performed; in response to determining that the radiation resonance frequency is smaller than the predetermined frequency band, the frequency increasing correction step is performed.

10. The frequency correction method of the antenna structure of claim 9, wherein a resonance frequency band of the antenna structure comprises a cavity resonance frequency and the radiation resonance frequency, the cavity resonance frequency corresponds to the resonance cavity, the cavity resonance frequency is greater than or equal to 37 GHz and smaller than or equal to 40 GHZ, and the radiation correction resonance frequency is greater than or equal to 26.5 GHZ and smaller than or equal to 29.5 GHz.

* * * * *